(12) United States Patent
Franco et al.

(10) Patent No.: US 6,613,825 B1
(45) Date of Patent: *Sep. 2, 2003

(54) FILLER REINFORCED COMPOSITIONS OF SYNDIOTACTIC POLYMERS OF STYRENE

(75) Inventors: Raffaele Franco, Venice (IT); Alessandro Moro, Venice (IT); Marco Scapin, Venice (IT); Riccardo Po', Leghorn (IT)

(73) Assignee: Enichem S.p.A., San Donato Milanese (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 22 days.

(21) Appl. No.: 09/200,752

(22) Filed: Nov. 30, 1998

(30) Foreign Application Priority Data

Dec. 19, 1997 (IT) .......................................... MI97A2808

(51) Int. Cl.⁷ ..................... C08K 13/08; C08L 25/04; C08J 3/20
(52) U.S. Cl. .................. 524/261; 523/200; 523/213; 523/214; 524/81; 524/262; 524/264; 524/265; 524/442; 524/451
(58) Field of Search .................. 523/200, 213, 523/214; 524/262, 264, 265, 81, 442, 451, 261

(56) References Cited

U.S. PATENT DOCUMENTS

| 5,075,351 A | * 12/1991 | Joslyn et al. ................ 523/200 |
| 5,270,353 A | * 12/1993 | Nakano et al. .............. 523/214 |
| 5,436,397 A | * 7/1995 | Okada ........................ 524/494 |
| 5,637,629 A | * 6/1997 | Moro et al. ................. 523/203 |

FOREIGN PATENT DOCUMENTS

| EP | 0 069 937 | 1/1983 | |
| EP | 314146 | * 10/1988 | ........... C08L/25/02 |
| EP | 0 736 364 | 10/1996 | |

* cited by examiner

Primary Examiner—Kelechi Egwim
(74) Attorney, Agent, or Firm—Oblon, Spivak, McClelland, Maier & Neustadt, P.C.

(57) ABSTRACT

Thermoplastic compositions are disclosed based on syndiotactic polymers of styrene, reinforced with rigid fillers, comprising: a) a crystalline syndiotactic polymer of styrene; b) a polyarylene-ether; c) 1–200 parts by weight, with respect to 100 parts of (a)+(b), one or more inorganic and/or organic rigid fillers; and d) a silanic compound with a compatibilizing function.

19 Claims, No Drawings

FILLER REINFORCED COMPOSITIONS OF SYNDIOTACTIC POLYMERS OF STYRENE

The present invention relates to thermoplastic compositions based on syndiotactic polymers of styrene, reinforced with inorganic and/or organic rigid fillers.

More specifically this composition comprises:
a) 100–80% by weight of a crystalline syndiotactic polymer of styrene;
b) 0–20% by weight of a polyarylene-ether;
c) 1–200 parts by weight, with respect to 100 parts of (a)+(b), of one or more inorganic and/or organic rigid fillers;
d) 0.01–5 parts by weight, with respect to 100 parts of (a)+(b), of a silanic compound having general formula (I):

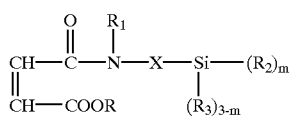

wherein
R and $R_1$ are, independently, hydrogen or an alkyl radical containing from 1 to 8 carbon atoms;
$R_2$ is a hydrolyzable alkoxyl group containing from 1 to 6 carbon atoms or a halogen atom;
$R_3$ is an alkyl radical containing from 1 to 8 carbon atoms;
X is either a radical having the formula

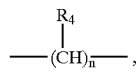

or an aromatic or cycloaliphatic or heterocyclic radical, wherein $R_4$ is hydrogen or an alkyl radical containing from 1 to 18 carbon atoms and n is an integer between 1 and 4;
m is an integer between 1 and 3.

The compositions claimed have improved thermal properties, creep resistance and impact strength with a consequent increase in rigidity and shock-resistance properties and they can be used for applications in the field of household appliances and in the electronic and car industries.

It is known that styrene polymers have a good rigidity but poor resistance to solvents, heat and impact; the discovery of new catalysts has recently allowed the synthesis of polystyrenes with a high degree of syndiotaxy, which are crystalline rather than amorphous, very rigid and with a high melting point.

Owing to the different molecular conformation, these new polystyrenes have reasonable resistance to heat and solvents but retain the fragility of the atactic polymer.

In an attempt to improve both resistance to creep deformation (induced by a constant loading, generally at high temperatures) and impact, efforts have been made to reinforce the new polymer with inorganic fibres.

As, to obtain this result, it is necessary to have good adhesion between the fibre and polymeric matrix, research has been directed towards determining under what conditions this can be achieved.

In this respect, the U.S. document U.S. Pat. No. 5,426,171 (Huang et al.) describes the use of small amounts of polyphenylene-ethers grafted with maleic anhydride (PPO-g-MAH) associated with a silane, both operating on the polymer and sizing the glass fibre.

U.S. Pat. No. 5,270,353 (Nakano et al.), on the other hand, claims a composition comprising a styrene polymer having a syndiotactic configuration, a styrene polymer modified with epoxy groups and a sized inorganic filler, to favour compatibilization between the components.

In U.S. Pat. No. 5,395,890 (Nakano et al.), a rubber and/or inorganic filler is added to the styrene polymer/thermoplastic resin (generally PET) mixture to improve the heat resistance and impact strength.

The patent EP 0 314 146 (Albizzati et al.), on the other hand, relates to a composition based on syndiotactic styrene polymers and polyphenylene-ethers (PPO) which, also in this case, has improved mechanical properties compared with compositions containing amorphous or isotactic polystyrene.

U.S. Pat. No. 5,412,024 (Okada et al.) describes thermo plastic compositions which comprise syndiotactic polymers whose modified end-group is bound to compounds having polar groups in the presence of an inorganic filler.

U.S. Pat. No. 5,436,397 (Okada et al.) describes a composition with improved mechanical properties comprising a polystyrene resin as such and modified, an elastomeric compound and an inorganic filler.

In conclusion, all the compositions claimed, either limit themselves to facing the problem of impact strength by using rubbers (which however reduce the rigidity and heat resistance) or try to solve the problem of adhesion matrix/filler by both modifying the polymer by the introduction of particular reactive groups, and covering the filler with substances which favour adhesion; in all cases however, the process is complicated and incomplete.

On the other hand, there are also documents that describe the use of compatibilizing compounds applied to polypropylene reinforced with mica (EP 0 69 937—Moro et al.) or, more generally, to reinforced polyolefins (EP 0 370 551—Joslyn et al.).

The Applicant has now overcome the above drawbacks by preparing a mixture in a single phase, which comprises syndiotactic styrene polymer to which small amounts of a polyarylate, a rigid filler and a particular compatibilizing compound are generally added, without the necessity, therefore, of preparing the polymeric matrix for adhesion with the filler by means of particular pretreatment processes.

The present invention consequently relates to thermoplastic compositions based on syndiotactic polymers of styrene, reinforced with inorganic and/or organic rigid fillers.

More specifically this composition comprises:
a) 100–80% by weight of a crystalline syndiotactic polymer of styrene;
b) 0–20% by weight of a polyarylene-ether;
c) 1–200 parts by weight, with respect to 100 parts of (a)+(b), of one or more inorganic and/or organic rigid fillers;
d) 0.01–5 parts by weight, with respect to 100 parts of (a)+(b), of a silanic compound having general formula (I):

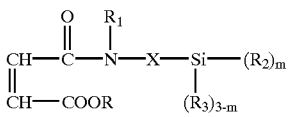 (I)

wherein
R and $R_1$ are, independently, hydrogen or an alkyl radical containing from 1 to 8 carbon atoms;
$R_2$ is a hydrolyzable alkoxyl group containing from 1 to 6 carbon atoms or a halogen atom;
$R_3$ is an alkyl radical containing from 1 to 8 carbon atoms;
X is either a radical having the formula

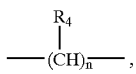, or an aromatic or cycloaliphatic or heterocyclic radical, wherein $R_4$ is hydrogen or an alkyl radical containing from 1 to 18 carbon atoms and n is an integer between 1 and 4;
m is an integer between 1 and 3.

A preferred form of this composition is the following:
a) 100–95% by weight of a crystalline syndiotactic polymer of styrene;
b) 0–5% by weight of a polyarylene-ether;
c) 10–70 parts by weight, with respect to 100 parts of (a)+(b), of one or more inorganic and/or organic rigid fillers;
d) 0.1–3 parts by weight, with respect to 100 parts of (a)+(b), of a compound having general formula (I), described above.

Component (a) is given by a styrene homo- or co-polymer with a prevalently syndiotactic configuration; this means that the stereostructure of the polymer has phenyl or phenyl-substituted side groups situated alternately in opposite directions with respect to the main chain represented according to a Fisher projection.

The preparation of these polymers can be carried out, according to what is known in the art, in bulk, solution or suspension, at temperatures generally ranging from −50 to 120° C. and pressures generally ranging between 0.1 and 5 atmospheres, using catalytic systems containing as main components a titanium complex (for example $TiX_4$, $CpTiX_3$, $Cp^*TiX_3$, with Cp=cyclopentadienyl, $Cp^*$=pentamethylcyclopentadienyl, X=alkyl, alkoxide, halogen, carboxylate, dialkylamine, etc., and the various X can also be different from each other) and a co-catalyst selected from an alkylaluminoxane (preferably methylaluminoxane) or a derivative of tris(pentafluorophenyl)boron.

The catalytic system may optionally also contain other activator components such as aluminum alkyls or tin alkyls, etc. (see, for example, EP 0 780 405).

The degree of taxis can be quantitatively determined by means of NMR (Nuclear Magnetic Resonance) of carbon 13 according to the method described in U.S. Pat. No. 4,680,353.

The styrene polymers with a prevalently syndio-tactic configuration mentioned in this composition comprise, among others, homo- and co-polymers containing styrene, ortho-, meta- and para-substituted alkylstyrenes, ortho-, meta- and para-substituted halogen alkylstyrenes (or mixtures of these two polymers), with a degree of syndiotaxy, measured according to the method indicated, which is such that the proportion of racemic dyads is at least 75% or preferably higher than 85%, or, even better, 95%, and the proportion of racemic pentads is at least 30%, or, preferably, 50%; however the polymer which is particularly suitable is polystyrene.

The polyarylene-ether (b) is a polymer or copolymer comprising a sequence of basic units which can be represented by the following general formula:

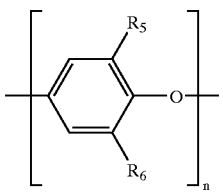

wherein n is an integer between 50 and 1000, $R_5$ and $R_6$, the same or different, are hydrogen, halogens such as F, Cl or Br, hydrocarbon radicals which do not contain tertiary carbons in a position (for example, methyls, ethyls, n-propyls, n-butyls), halogenated or hydroxyha-logenated hydrocarbon radicals containing at least 2 carbon atoms between the benzene ring and the halogen and without tertiary carbons in position α [for example —$(CH_2)_2Cl$, —$(CH_2)_2Br$, —$(CH_2)_3Cl$, —$(CH_2)_3Br$].

The most preferable is poly(2,6-dimethyl-1,4-phenylene-ether), generally known as PPO, with an intrinsic viscosity [η] measured in chloroform at 23° C., ranging from 0.28 to 0.70 dl/g, preferably 0.50 dl/g.

The rigid fillers (c) comprise inorganic and/or organic fillers with an aspect ratio or, in the case of fibres, length with respect to diameter (L/D) higher than 5 and include, among others, glass fibres, ceramic whiskers, wollastonite, mica, carbon fibres and aramidic fibres; glass fibre is preferable with a length of 0.1 to 10 mm and L/D ranging from 5 to 100.

These fillers, optionally calcined, may also comprise a surface coating, generally based on silanic compounds or titanates, which induce better adhesion between the filler and polymeric matrix.

When glass fibre is used in particular, this can also be sized with solutions of appropriate compatibilizing agents before mixing with the other components or, if already sized (for example in the case of a commercial filler), it may undergo an additional sizing with suitable solutions.

The various compatibilizing agents comprise silanic compounds and titanates and, for example, γ-amino-propyl-triethoxysilane is particularly suitable.

Compound (d) is described by formula (I); among the silanes described in this formula, those in which R and $R_1$ are hydrogen atoms, $R_2$ is an alkoxyl radical containing from 1 to 4 carbon atoms (for example, —O—$CH_3$, —O—$C_2H_5$, —O—$C_3H_7$ or —O—$C_4H_9$), $R_4$ is a hydrogen, n is 2 or 3 and m is equal to 0, are preferable.

Maleamic silane defined as SiMA is particularly indicated, which can be distinguished by the following formula:

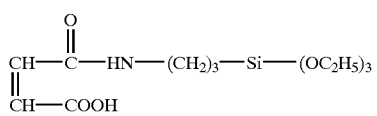

and is prepared according to the process described in EP 0 69 937, whose content is an integrating part of the present application.

The composition of the present invention may optionally contain antioxidants, nucleating agents, stabilizers and process aids.

Antioxidants which can be used are those containing phosphorous such as monophosphites, diphosphites and phosphonites, for example tris(2,4-di-ter-butylphenyl) phosphite, di-nonyl-phenyl phosphite, di-stearyl-pentaerythritol-di-phosphite, tetrakis(2,4-di-ter-butyl-phenyl)4,4'-biphenylene-di-phosphonite and diphosphites generally represented by the formula:

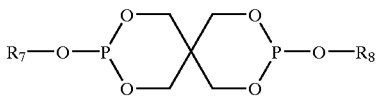

wherein $R_7$ and $R_8$ both represent alkyl groups comprising from 1 to 20 carbon atoms, cycloalkyl groups with 3–20 carbon atoms or aryl groups with 6–20 carbon atoms; bis(2,4-di-ter-butyl-phenyl)-pentaerythritol-di-phosphite, commercially known as Ultranox 626 of General Electric, is particularly suitable.

Another group of antioxidants suitable for the purpose, are those based on sterically hindered phenols and therefore, among others, 2,6-di-ter-butyl-4-methyl-phenol, 2,6-di-phenyl-4-methoxy-phenol, bis[3-(5-ter-butyl-4-hydroxy-m-tolyl)propionate] of ethylenebis-oxy-ethylene, 1,1,3-tris(2-methyl-4-hydroxy-5-ter-butyl-phenyl)butane and, preferably, tetrakis[3-(3,5-di-ter-butyl-4-hydroxy-phenyl) propionate] of pentaerythritol, commercially known as Irganox 1010 of Ciba-Geigy.

A final group of antioxidants is represented by sulfur compounds, such as thioethers, among which di-lauryl-3,3'-thio-di-propionate, di-stearyl-3,3'-thio-di-propionate and, preferably, pentaerythritol-tetra-kis-(β-lauryl-thiopropionate).

These antioxidants can be added in a mixture in weight percentages ranging from 0.01 to 1 with respect to the polymer, with ratios [phosphorous compounds]/[phenol compounds]/[sulfur compounds] ranging from 50/10/1 to 0.5/1/1 and preferably from 10/10/1 to 1/1/1.

The couple Irganox 1010/Ultranox 626 in a weight ratio of 1/5 for a total of 0.5–1 parts per 100 parts of polymer, is particularly effective.

Among nucleating agents for the crystallinity, metal salts of organic acids, among which sodium or aluminum benzoate, or, preferably extra-fine talc, can be mentioned; these nucleating agents can be added to the composition in a quantity of 0.1–5 parts by weight per 100 parts of polymer and, preferably, 0.5–2.

Finally, it is also possible to add quantities of rubber to the composition to provide better impact strength, for example, ethylene-propylene rubbers (EPR), ethylene-propylene-diene rubbers (EPDM), or, preferably, copolymers containing a styrene polymer, among which styrene-butadiene-styrene (SBS), hydrogenated styrene-butadiene-styrene (SEBS), acrylonitrile-butadiene-styrene (ABS) rubbers; these rubbers can be added to the compound in percentages ranging from 0 to 100 by weight.

The process for the preparation of the composition in question comprises a first method which consists in dry-mixing the four components (a), (b), (c) and (d), and subsequently treating this compound in a mixing apparatus at temperatures ranging from 270 to 320° C., preferably 280° C., with a number of revs ranging from 50 to 200 rpm, preferably 100 rpm, and for a time ranging from 4 to 10'.

Equipment for the mixing of polymers in the molten state such as single-screw and twin-screw extruders, plastographs and Banbury mixers can be used for the purpose.

The second method consists in a pretreatment, at temperatures ranging from 270 to 320° C., of the resin based on polystyrene (a) in the mixing apparatus defined above until the complete melting of the polymer, followed by the addition of components (b), (c) and (d).

The composition of the present invention has a high modulus, resistance to hydrolysis and heat with consequent improved thermal properties making it useful for applications at high temperatures.

The following experimental examples are illustrative but do not limit the scope of the present invention.

The syndiotactic polystyrene used in the tests described below was obtained using a catalytic system consisting of tetraethyl-ortho-titanate and methyl-aluminoxane (MAO) in a molar ratio equal to styrene/aluminum/titanium=60000/500/1, operating with a procedure analogous to the one described in EP 0 751 154.

The resulting product was purified by extraction with methylethylketone to eliminate the atactic fraction and, upon analysis, proved to be a syndiotactic polystyrene with a degree of stereo regularity corresponding to 99.5% of racemic dyads determined according to $^{13}$C-NMR and a weight average molecular weight ($M_W$) of 55,000, determined by means of steric exclusion chromatography (SEC), with a polydispersity degree of 2.4.

EXAMPLE 1

Several mixtures based on syndiotactic polystyrene SPS (a), Vetrotex P514 glass fibre previously calcined in air at 500° C. for 1 hour (c), PPO Nippon H51 (b) and maleamic silane SiMA (d) were prepared using a Brabender Plasti-Corder plastograph equipped with high shear rotors.

The polymer (a) was charged into the plastification chamber thermostat-regulated at 280° C. in which rotors rotate at 100 rpm, and brought to melting point.

A couple of minutes after loading, (b), (c) and (d) pre-mixed were added and the whole mixture was treated until the $6^{th}$ minute.

The material obtained was then compression moulded at 300° C. for 6 minutes into a small plate having dimensions of (10×8×3.2) mm and milled to obtain test samples: 3 Izod type of (3.2×12.7×63) mm and 3 micro tensile ASTM D1708.

The flexual modulus ASTM D790 was measured on the Izod type samples on the segment relating to a deformation of 0.05% to 0.10%, and the the flexural creep was evaluated and finally the notched Izod test ASTM D256.

For the creep test, a mechanical dynamic analyzer RSA-II of Rheometrics was used, in the flexural geometry on three points with a distance between the supports of 48 mm.

The tests were carried out on Izod rods, applying a flexural stress of 1 MPa and then measuring the ε deformation up to 10' or 1 hour, depending whether the temperature had been set at 170 or 110° C.

In order to reduce any effects of thermal and deformational history, all the tests were carried out in the same way, thermostat-regulating the sample for 2 minutes with a pre-loading of 20 g and then bringing the stress to 1 MPa.

In the case of the tests carried out at 170° C., the ε deformation has a linear trend against the time expressed in logarithmic scale and it is therefore possible to interpolate the experimental data within the range of 1–10' to provide the intercept and slope of the lines obtained: the former represents the instantaneous elastic deformation whereas the latter indicates the real tendency towards creep.

An ASTM D1708 test was carried out on the micro tensile type test samples with a traction rate of 1.3 mm/min. determining the ultimate tensile stress (UTS) and the ultimate elongation (UE), whereas with other parts of the plate it was possible to measure the VICAT ASTM D1525 [5 Kg] and the MVI ASTM D1238 [310° C., 1.2 Kg].

Table 1 shows the data obtained and from this it is possible to observe the effects of the PPO and SiMA on the properties under examination.

Comparison of tests A and B shows how SiMA alone allows a certain improvement to be obtained in the creep and VICAT thermal properties.

A further addition of 3% of PPO (test D), gives a further and unexpected improvement in the creep, VICAT and Izod and re-acquires the high E modulus and MVI fluidity values of the blank test (A) which, on the contrary, are depressed by the presence of PPO alone (C).

Tests E and F reconfirm what was previously observed but show, however, how the optimum quantity of PPO must be limited to 3–4%.

EXAMPLE 2

Several mixtures based on syndiotactic polystyrene SPS (a), Vetrotex P514 glass fibre previously calcined in air at 500° C. for 1 hour (c), PPO (b) and maleamic silane SiMA (d) were prepared using a Brabender Plasti-Corder plastograph equipped with high shear rotors.

In this case (a), (b), (c) and (d) premixed, were charged together into the plastification chamber thermostat-regulated at 280° C. in which rotors rotate at 100 rpm and the whole mixture was treated up to the $6^{th}$ minute.

The PPO were selected on the basis of the molecular weight, which can be deduced as the intrinsic viscosity value from the same commercial abbreviation: for example, H30 corresponds to an intrinsic viscosity $[\eta]$ of 0.30 dl/g in chloroform at room temperature.

Table 2 indicates the compositions and data obtained according to the evaluation techniques described in experimental example 1; in this case it is possible to evaluate the effect of the PPO molecular weight and the effect of the different preparation procedures.

With respect to the first point, we can confirm how, regardless of the type of PPO, the presence of SiMA always provides and improvement in terms of creep and VICAT; it can then be easily verified how with an increase in the PPO molecular weight, creep properties (for example evaluating the slope) tend to improve together with the VICAT.

Comparing test O with C, and P with D, we can verify how the method which comprises the addition of FV to the molten polymer (tests C and D) gives better results than those obtained by charging all the components together into the plastograph (tests O and P).

TABLE 1

|  | A | B | C | D | E | F |
|---|---|---|---|---|---|---|
| SPS (%) | 100.0 | 100.0 | 97.0 | 97.0 | 94.0 | 94.0 |
| PPO Nippon H51 (%) |  |  | 3.0 | 3.0 | 6.0 | 6.0 |
| FVC (FV P514 calcined) (phr) | 25.0 | 25.0 | 25.0 | 25.0 | 25.0 | 25.0 |
| SiMA (phr) |  | 1.9 |  | 1.9 |  | 1.9 |
| E flex. seg. (MPa), ASTM D790 | 5300 | 4700 | 4800 | 5400 | 4800 | 5200 |
| UTS (MPa), ASTM D1708 | 32 | 38 | 42 | 45 | 50 | 44 |
| UE (%), ASTM D1708 | 2.5 | 1.8 | 2.2 | 2.1 | 3.0 | 2.3 |
| Izod (J/m), ASTM D256 | 14 | 21 | 21 | 32 | 20 | 33 |
| Str. fl. creep [110° C., 1MPa] (‰) | 2.5 | 2.2 | 2.7 | 1.5 | 3.8 | 1.8 |
| Str. fl. creep [170° C., 1MPa, $10^1$] (‰) |  | 2.5 | 4.5 | 2.7 | 6.1 | 3.3 |
| Intercept [170° C., $1$–$10^1$] (‰) |  | 1.3 | 2.0 | 1.5 | 2.8 | 1.8 |
| Slope [170° C., $1$–$10^1$] (‰) |  | 0.4 | 0.9 | 0.4 | 1.2 | 0.6 |
| VICAT 5 kg (° C.) | 158 | 161 | 153 | 176 | 145 | 167 |
| MVI [310° C., 1.2 kg] (g/$10^1$) | 17 | 18 | 12 | 18 | 12 | 17 |

TABLE 2

|  | G | H | I | L | M | N | O | P |
|---|---|---|---|---|---|---|---|---|
| SPS (%) | 97.0 | 97.0 | 97.0 | 97.0 | 97.0 | 97.0 | 97.0 | 97.0 |
| FVC (FV P514 calcined) (phr) | 25.0 | 25.0 | 25.0 | 25.0 | 25.0 | 25.0 | 25.0 | 25.0 |
| PPO Nippon H30 (%) | 3.0 | 3.0 |  |  |  |  |  |  |
| PPO Nippon H41 (%) |  |  | 3.0 | 3.0 |  |  |  |  |
| PPO Nippon H46 (%) |  |  |  |  | 3.0 | 3.0 |  |  |
| PPO Nippon H51 (%) |  |  |  |  |  |  | 3.0 | 3.0 |
| SiMA (phr) |  | 1.9 |  | 1.9 |  | 1.9 |  | 1.9 |
| E flex. seg. (MPa), ASTM D790 | 4300 | 4400 | 3400 | 4400 | 4200 | 4300 | 4400 | 4400 |
| UTS (MPa), ASTM D790 | 36 | 36 | 43 | 39 | 36 | 40 |  | 32 |
| UE (%), ASTM D1708 | 1.4 | 1.6 | 2.0 | 1.5 | 1.5 | 1.7 |  | 1.7 |
| Izod (J/m), ASTM D256 | 13 | 18 | 14 | 18 | 15 | 18 |  | 22 |
| Str. fl. creep [110° C., 1 MPa, 1 h] (%) |  |  |  |  |  |  | 3.8 | 1.8 |
| Str. fl. creep [170° C., 1 MPa, 10'] (%) | 7.1 | 5.4 | 6.8 | 5.9 | 5.7 | 5.1 | 5.6 | 5.2 |
| Intercept [170° C., 1–10'] (%) | 2.9 | 2.3 | 2.9 | 2.4 | 2.5 | 2.1 | 2.8 | 2.2 |
| Slope [170° C., 1–10'] (%) | 1.5 | 1.1 | 1.4 | 1.3 | 1.1 | 1.1 | 1.0 | 0.7 |
| VICAT 5 kg (° C.) | 139 | 148 | 139 | 145 | 142 | 144 |  | 152 |
| MVI [310° C., 1.2 kg] (g/10') | 23 | 20 | 25 | 19 | 30 | 30 | 15 | 14 |

What is claimed is:

1. A reinforced thermoplastic composition, consisting essentially of:
   a) 100–80% by weight of a crystalline syndiotactic polymer of styrene having a degree of syndiotaxy of at least 75%;
   b) 0–20% by weight of a polyarylene-ether;
   c) 1–200 parts by weight with respect to 100 parts of (a)+(b), of one or more rigid inorganic fillers;
   d) 0.01–5 parts by weight, with respect to 100 parts of (a)+(b), of a silanic compound having formula (I):

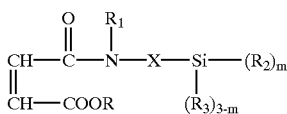 (I)

wherein
R and $R_1$ are, independently from each other, hydrogen or an alkyl radical containing from 1 to 8 carbon atoms;
$R_2$ is a hydrolyzable alkoxy group containing from 1 to 6 carbon atoms or a halogen atom;
$R_3$ is an alkyl radical containing from 1 to 8 carbon atoms;
X is either a radical having the formula:

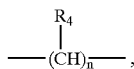

or an aromatic or cycloaliphatic or heterocyclic radical, wherein $R_4$ is hydrogen or an alkyl radical containing from 1 to 8 carbon atoms and n is an integer of 1 to 4;
m is an integer of 1 to 3.

2. The composition according to claim 1, wherein the styrene polymer is a polystyrene.

3. The composition according to claim 1, wherein the polyarylene-ether is poly(2,6-dimethyl-1,4-phenylene-ether) (PPO).

4. The composition according to claim 3, wherein the PPO has an intrinsic viscosity ranging from 0.28 to 0.70 dl/g.

5. The composition according to claim 1, wherein the rigid filler (c) has an aspect ratio or, in the case of fibres, length/diameter higher than 5.

6. The composition according to claim 5, wherein the rigid filler is glass fiber.

7. The composition according to claim 6, wherein the glass fiber was calcined or is sized with a solution containing a compatibilizing agent.

8. The composition according to claim 7, wherein the compatibilizing agent is γ-amino-propyl-triethoxy silane.

9. The composition according to claim 6, wherein the glass fiber is pre-treated on the surface.

10. The composition according to claim 6, wherein the glass fiber is previously calcined in air at 500° C. for 1 hour.

11. The composition according to claim 1, wherein the compound (d) is maleamic silane.

12. The composition according to claim 11, wherein the antioxidants are selected from the group consisting of tetrakis[3-(3,5-di-ter-butyl-4-hydroxyphenyl)propionate] of pentaerythritol and bis[2,4-di-ter-butylphenyl) pentaerythritol-di-phosphite and the nucleating agents are selected from the group consisting of talc, sodium benzoate and aluminum benzoate.

13. The composition according to claim 12, wherein the talc is added to the composition in a quantity of 0.1–5 parts by weight per 100 parts of polymer.

14. The composition according to claim 3, wherein the PPO has an intrinsic viscosity from 0.28 to 0.5 dl/g.

15. The composition according to claim 12, wherein the talc is added to the composition in a quantity of 0.5–2 parts by weight per 100 parts of polymer.

16. The composition according to claim 12, wherein the weight ratio: tetrakis[3-(3,5-di-ter-butyl-4-hydroxy-phenyl)propionate] of pentaerythritol/bis(2,4-di-ter-butyl-phenyl)-pentaerythritol-di-phosphite is equal to 1/10 for a total of 0.5–1 parts by weight per 100 parts of polymer.

17. The composition according to claim 12, wherein the weight ratio: tetrakis[3-(3,5-di-ter-butyl-4-hydroxy-phenyl)propionate] of pentaerythritol/bis(2,4-di-ter-butyl-phenyl)-pentaerythritol-di-phosphite is 1/5.

18. The composition according to claim 1, wherein the content of said one or more inorganic or organic rigid fillers ranges from 10–70 parts by weight and the amount of the silanic compound of formula (I) ranges from 0.1 to 3 parts by weight.

19. A reinforced thermoplastic composition, consisting essentially of:
   a) 100–80% by weight of a crystalline syndiotactic polymer of styrene having a degree of syndiotaxy of at least 75%;
   b) 0–20% by weight of a polyarylene-ether;
   c) 1–200 parts by weight with respect to 100 parts of (a)+(b), of one or more rigid inorganic rigid fillers;
   d) 0.01–5 parts by weight, with respect to 100 parts of (a)+(b), of a silanic compound having formula (I):

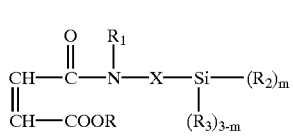 (I)

wherein
R and $R_1$ are, independently from each other, hydrogen or an alkyl radical containing from 1 to 8 carbon atoms;
$R_2$ is a hydrolyzable alkoxy group containing from 1 to 6 carbon atoms or a halogen atom;
$R_3$ is an alkyl radical containing from 1 to 8 carbon atoms;
X is either a radical having the formula:

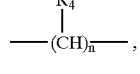

or an aromatic or cycloaliphatic or heterocyclic radical, wherein $R_4$ is hydrogen or an alkyl radical containing from 1 to 8 carbon atoms and n is an integer of 1 to 4;
m is an integer of 1 to 3; and
e) at least one adjuvant selected from the group consisting of antioxidants, nucleating agents, stabilizers and process aids.

* * * * *